US011879302B2

(12) United States Patent
Glad et al.

(10) Patent No.: US 11,879,302 B2
(45) Date of Patent: Jan. 23, 2024

(54) EXTRUSION PREVENTING DEVICE FOR INCORPORATION INTO A SEALING ELEMENT AND A WELL TOOL DEVICE COMPRISING A SEALING ELEMENT IN WHICH SUCH AN EXTRUSION PREVENTING DEVICE IS INCORPORATED

(71) Applicant: Interwell Norway AS, Hafrsfjord (NO)

(72) Inventors: Anders Glad, Trondheim (NO); Thomas Hiorth, Trondheim (NO)

(73) Assignee: Interwell Norway AS, Hafrsfjord (NO)

( * ) Notice: Subject to any disclaimer, the term of this patent is extended or adjusted under 35 U.S.C. 154(b) by 30 days.

(21) Appl. No.: 17/636,763

(22) PCT Filed: Aug. 20, 2020

(86) PCT No.: PCT/EP2020/073285
§ 371 (c)(1),
(2) Date: Feb. 18, 2022

(87) PCT Pub. No.: WO2021/043582
PCT Pub. Date: Mar. 11, 2021

(65) Prior Publication Data
US 2022/0298884 A1     Sep. 22, 2022

(30) Foreign Application Priority Data
Sep. 3, 2019 (NO) .................................. 20191057

(51) Int. Cl.
*E21B 33/12* (2006.01)
*F16F 1/04* (2006.01)

(52) U.S. Cl.
CPC .......... *E21B 33/1216* (2013.01); *F16F 1/045* (2013.01)

(58) Field of Classification Search
CPC .......... E21B 33/1216; F16F 1/045; F16I 17/06
See application file for complete search history.

(56) References Cited

U.S. PATENT DOCUMENTS

| 4,509,763 A | * | 4/1985 | Fischer | ............... E21B 33/1208 277/342 |
| 4,655,462 A | * | 4/1987 | Balsells | .................. F16F 1/045 267/167 |

(Continued)

FOREIGN PATENT DOCUMENTS

| WO | 2014/178866 A1 | 11/2014 |
| WO | 2016/198881 A1 | 12/2016 |

OTHER PUBLICATIONS

International Search Report issued in PCT/EP2020/073285 dated Dec. 3, 2020 (9 pages).

(Continued)

*Primary Examiner* — D. Andrews
*Assistant Examiner* — Ronald R Runyan
(74) *Attorney, Agent, or Firm* — Osha Bergman Watanabe & Burton LLP

(57) ABSTRACT

An extrusion preventing device for incorporation into a sealing element of a well tool device includes a wire wound with a plurality of turns to form a torus-shaped coiled spring. Each turn of the torus-shaped coiled spring is canted. A method for manufacturing a sealing element for a well tool device includes providing a mould shaped as the sealing element; inserting an extrusion preventing device including a wire wound with a plurality of turns to form a torus-shaped coiled spring into the mould; filling molten elastomeric material into the mould, thereby incorporating the torus-shaped coiled spring into the molten elastomeric material; curing the elastomeric material; and retrieving the sealing element from the mould.

11 Claims, 7 Drawing Sheets

(56) References Cited

U.S. PATENT DOCUMENTS

| | | | |
|---|---|---|---|
| 4,809,989 A | 3/1989 | Kernal | |
| 5,239,737 A * | 8/1993 | Balsells | F16F 1/045 |
| | | | 29/896.9 |
| 5,265,890 A | 11/1993 | Balsells | |
| 5,343,946 A | 9/1994 | Morrill | |
| 5,603,511 A * | 2/1997 | Keyser, Jr | E21B 33/1216 |
| | | | 277/638 |
| 7,416,770 B2 | 8/2008 | Hiorth | |
| 9,464,498 B2 | 10/2016 | Hiorth | |
| 2001/0045746 A1* | 11/2001 | Russell | F16J 15/121 |
| | | | 285/105 |
| 2016/0032681 A1 | 2/2016 | McGruddy et al. | |
| 2016/0047473 A1 | 2/2016 | Foster et al. | |

OTHER PUBLICATIONS

Written Opinion of the International Searching Authority issued in PCT/EP2020/073285 dated Dec. 3, 2020 (3 pages).
Norwegian Search Report issued in No. 20191057 dated Mar. 16, 2020 (2 pages).

* cited by examiner

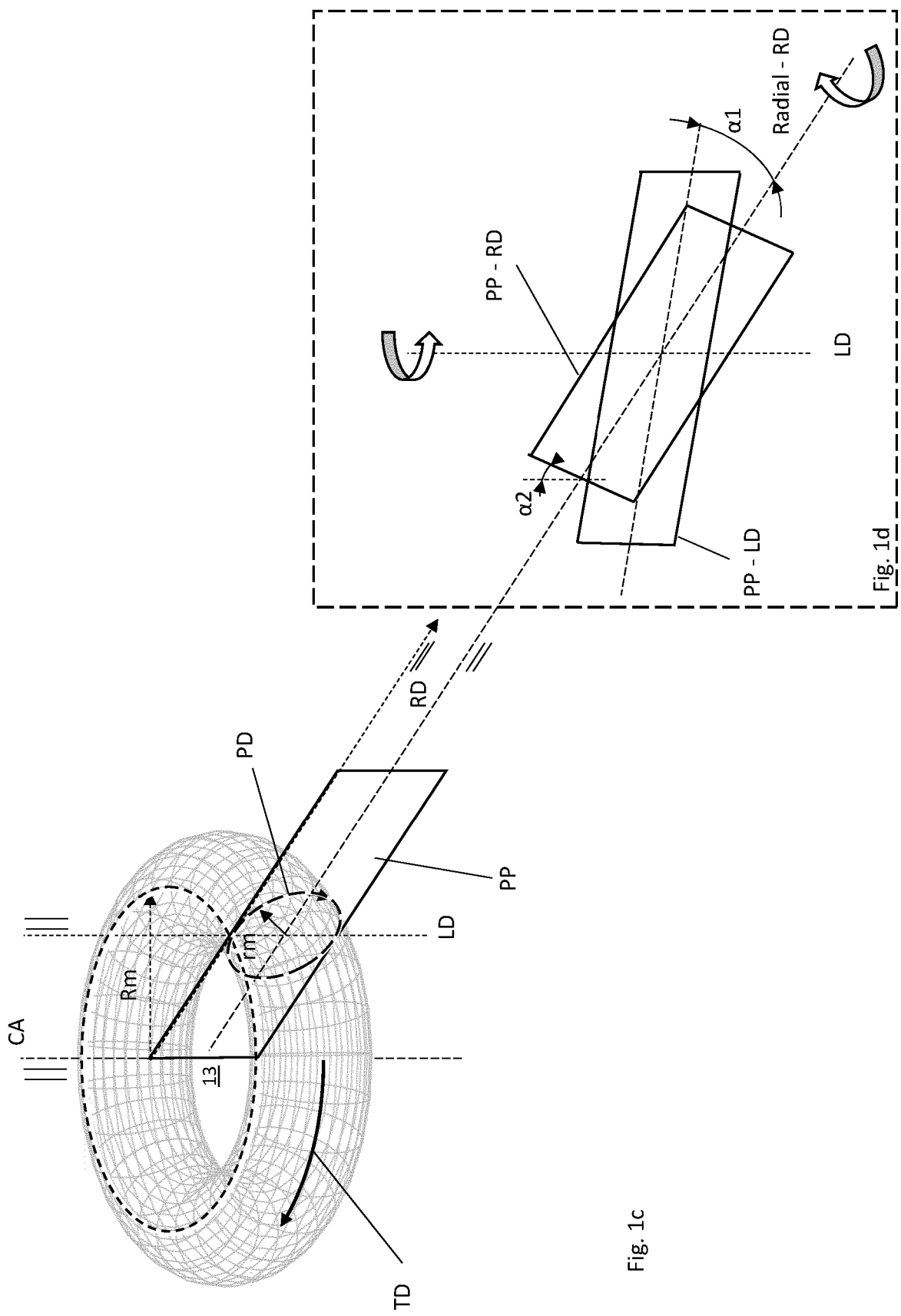

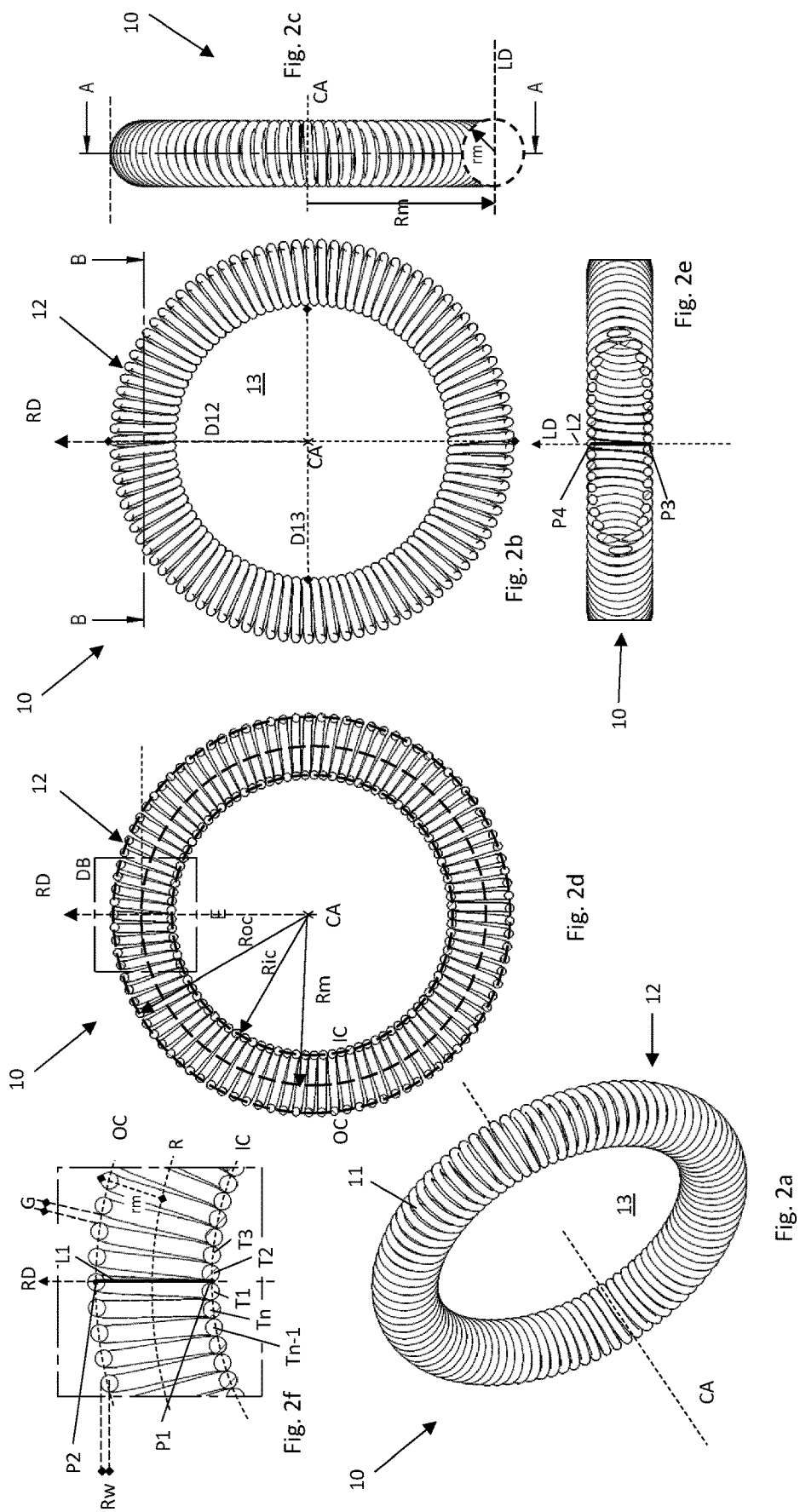

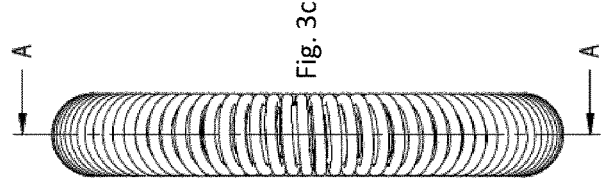
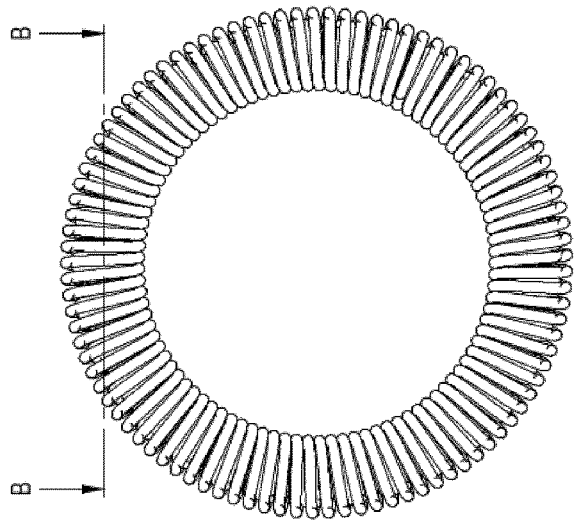
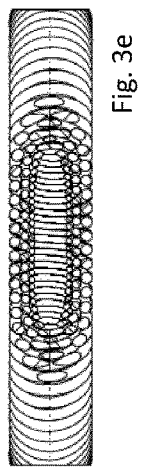
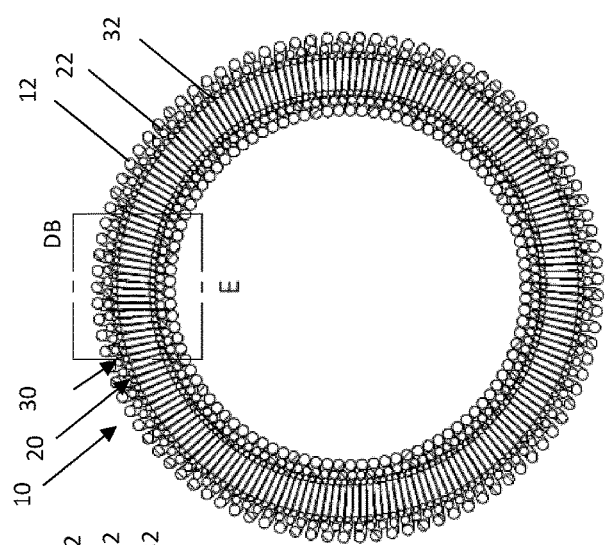
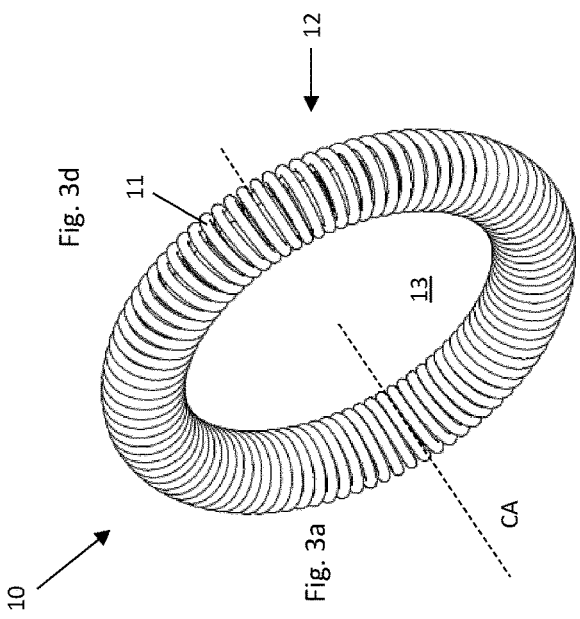

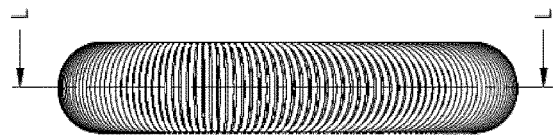
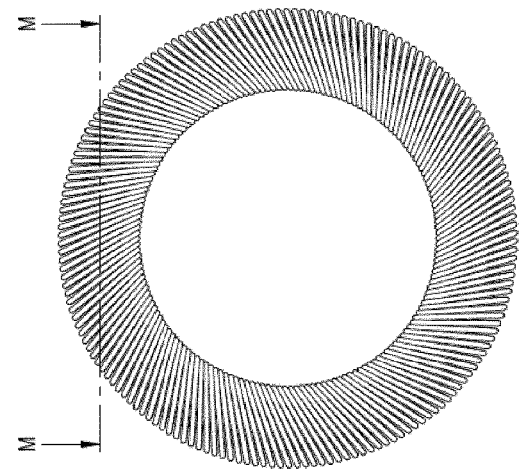
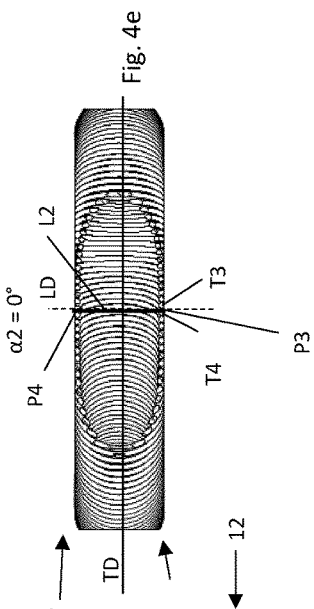
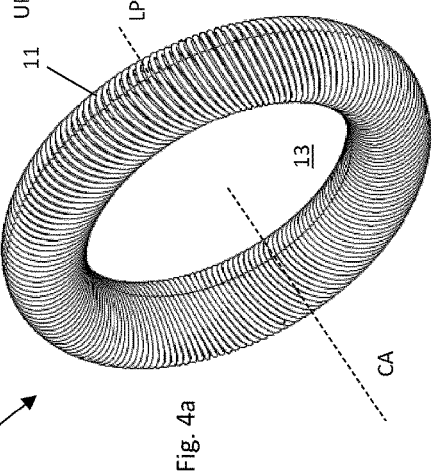
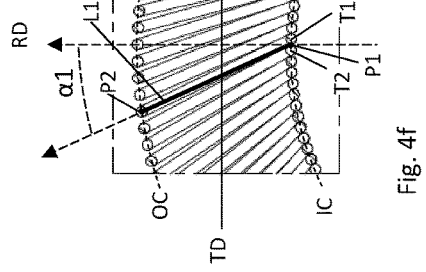

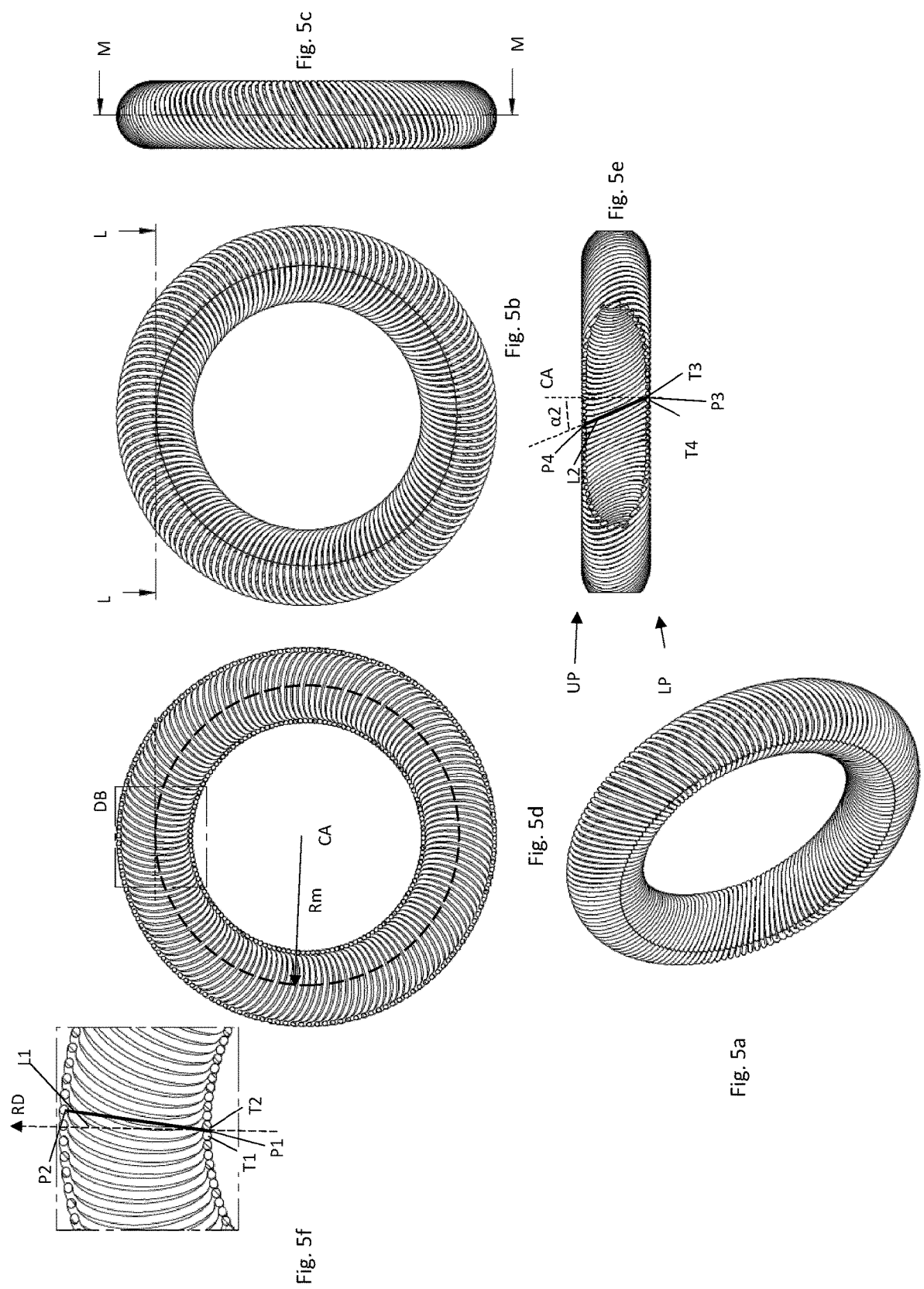

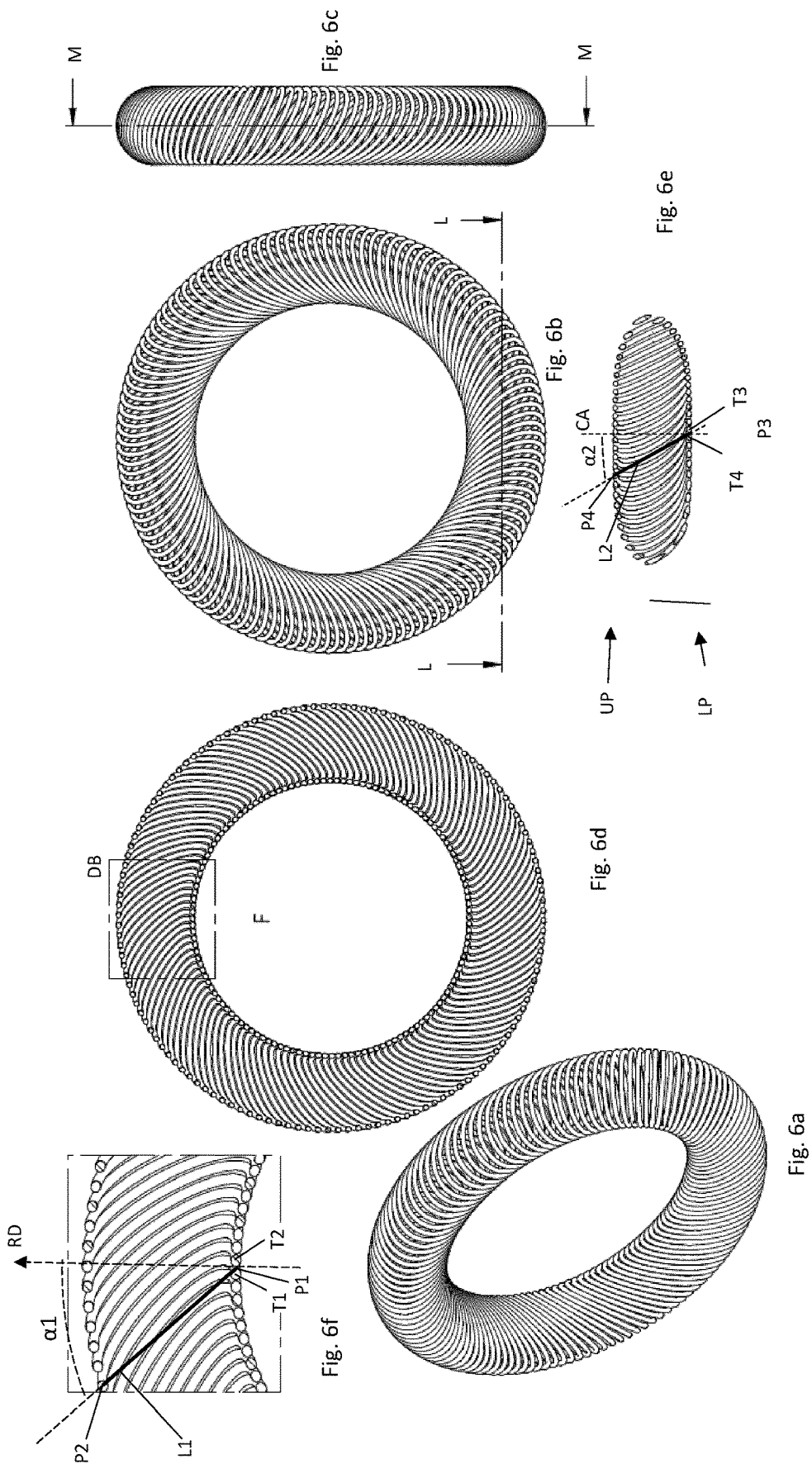

EXTRUSION PREVENTING DEVICE FOR INCORPORATION INTO A SEALING ELEMENT AND A WELL TOOL DEVICE COMPRISING A SEALING ELEMENT IN WHICH SUCH AN EXTRUSION PREVENTING DEVICE IS INCORPORATED

FIELD OF THE INVENTION

The present invention relates to an extrusion preventing device for incorporation into a sealing element of a well tool device. The present invention also relates to a well tool device comprising a sealing element in which such an extrusion preventing device is incorporated. The present invention also relates to a sealing element for a well tool device. The present invention also relates to a method for manufacturing a sealing element for a well tool device.

BACKGROUND OF THE INVENTION

Some well tool device has a purpose of sealing off a section of an oil and/or gas well. One simplified example of such a well tool device is indicated with reference number 1 in FIGS. 1a and 1b. The well tool device 1 is run into a well 2 in a radially retracted or run state (FIG. 1a) to a desired position. At this desired position, the well tool device 1 is brought to its radially expanded or set state (FIG. 1b), in which a sealing element 7 of a sealing device 5 is brought into contact with the inner surface 2a of the well 2, and hence prevents axial fluid flow between the lower side of the sealing element 7 and the upper side of the sealing element 7. The well tool device 1 typically also comprises an anchoring device 4 brought into contact with the inner surface 2a of the well 2 in the set state, for preventing axial displacement of the well tool device 1 when there is a differential pressure across the sealing element 7. A central longitudinal axis of the well tool device is indicated as a dashed line CA.

The sealing element 7 is typically made of a flexible material, such as elastomers, rubber materials etc, and is provided circumferentially around the outside of the well tool device 1.

In wells with higher pressures and/or higher temperatures, the sealing element 7 may become extruded or deformed as the differential pressure over the sealing element 7 increases.

One way of preventing such extrusion is to provide supporting elements (often referred to as "backups") below and above the sealing elements. Such supporting elements are indicated with reference number 6 in FIGS. 1a and 1b.

Another way of preventing such extrusion is to incorporate one or more extrusion preventing devices into the sealing element itself. Such extrusion preventing devices are indicated in FIGS. 1a and 1b with reference number 10. It should be noted that the above extrusion preventing supporting elements 6 and extrusion preventing devices 10 may be used together in the same well tool, they are not alternative to each other.

U.S. Pat. No. 7,416,770 (Hiorth) describes one such extrusion preventing device for incorporation into a sealing element. Here, the extrusion preventing device comprises elements inserted into each other, where the elements are allowed to be moved in relation to each other when the sealing element is brought from the run state to the set state. Hence, the diameter of the extrusion preventing device is allowed to expand.

U.S. Pat. No. 9,464,498 (Hiorth) describes another extrusion preventing device comprising a number of thimble-shaped elements assembled as a ring for incorporating into a sealing element.

U.S. Pat. No. 4,509,763 (Fischer) describes an extrusion preventing device comprising a coiled spring, in which cylindrical pin elements are provided to prevent deformation of the helical spring and to block gaps between the windings of the spring to prevent extrusion through these gaps.

U.S. Pat. No. 4,809,989 (Kernal) describes another example of a coiled spring incorporated into such sealing elements.

One prior art coiled spring is used in the sealing element of the Interwell ME (Medium Expansion) retrievable bridge plug. It is now referred to FIG. 2a-f, where this prior art extrusion preventing device 10 is illustrated in detail. Here, it is shown that the device 10 is forming a coiled spring 12 made of a coiled wire 11 with turns T1, T2, T3, . . . , Tn−1, Tn counted clockwise in FIG. 2d. The coiled spring 12 forms a torus, with a circular opening 13, a minor radius rm and a major radius Rm indicated in FIG. 2c. The major radius Rm is also indicated in FIG. 2d. The radius Rw of the wire 11 forming the coiled spring 12 is shown in FIG. 2f.

The radial direction RD is shown with an arrow perpendicular to the central axis CA of the well tool device 1.

An inner circle IC shown in FIGS. 2d and 2f, can be defined to have a radius Ric equal to the major radius Rm minus the minor radius rm plus the wire radius Rw. An outer circle OC shown in FIGS. 2d and 2f ca be defined to have a radius Roc equal to the major radius Rm plus the minor radius rm minus the wire radius Rw. As a result, the diameter D13 (FIG. 2b) of the opening 13 equals 2*(radius Ric minus wire radius Rw), alternatively 2*(major radius Rm minus minor radius rm). Moreover, the outer diameter D12 of the coiled spring 12 equals 2*(radius Roc plus wire radius Rw), alternatively 2*(major radius Rm plus minor radius rm).

In FIG. 2f, it is shown that a line L1 (thick solid line), drawn from a point P1, located between two adjacent turns (here T1 and T2) on the inner circle IC, to a point P2 located on the outer circle OC in the center of the cross section of the first turn T1, coincides with the radial direction RD (thin dashed arrow). Coiled springs where this line L1 coincides or substantially coincides with the radial direction RD when unaffected by external forces (unbiased), are referred to as straight coiled springs. As FIG. 2f is a cross section along line A-A in FIG. 2c, the cross section of FIG. 2f is referred to as a radial plane cross section.

In FIG. 2e, it is shown that a line L2 (thick solid line), drawn from a point P3 between two adjacent turns to a point P4 in the center of the cross section of the first of the two turns, is parallel with the central axis CA (thin dashed arrow).

As FIG. 2e is a cross section along line B-B in FIG. 2b, the cross section of FIG. 2e is referred to as a tangential plane cross section. Again, coiled springs where this line L2 are parallel with or substantially parallel with the central axis CA when unaffected by external forces (unbiased), are referred to as straight coiled springs.

It should be noted that the radial plane cross section is perpendicular to the tangential plane cross section.

In FIG. 2f, it is also shown a gap G between the turns of the coiled spring along the outer circle OC. In this prior art example, turns of the coiled spring are provided in contact with each other along the inner circle IC. It should be noted that FIG. 2a-f show the coiled spring unbiased, i.e. similar to the retracted state of FIG. 1a. In the expanded state of FIG. 1b, the major radius Rm will increase (consequently also the radius Roc and Ric will increase) and hence the gap G will increase—and there will also be a gap between the turns of the coiled spring along the inner circle IC.

An alternative prior art extrusion preventing device 10 is shown in FIG. 3a-f. Here, the device 10 in addition to the coiled spring 12 comprises a core 22. The core 22 is here formed by a coiled spring with similar properties as the coiled spring 12, having substantially the same major radius Rm as the coiled spring 12, but a smaller wire radius Rw and also a smaller minor radius rm than the coiled spring 12. The device 10 comprises a further core 32 inside the core 22, again with substantially the same major radius Rm as the coiled springs 12 and 22, but with a smaller wire radius Rw and also a smaller minor radius rm than the coiled spring 22. It should be noted that the wire radius Rw of the cores 22, 32 may be equal to or even larger than the wire radius Rw of the coiled spring 12.

It should be noted that in prior art, the core 22 may comprise cylindrical pin elements as described in U.S. Pat. No. 4,509,763.

One disadvantage of the coiled springs above is that when the sealing element is brought from the retracted state to the expanded state, the gap between each turn of the coiled spring increases, a gap into which the elastomeric material of the sealing element may extrude.

The object of the present invention is to provide an improved extrusion preventing device for incorporating into a sealing element. Hence, one object is to improve the pressure rating and/or temperature rating of well tool devices having such sealing elements.

Another purpose of the extrusion preventing device is that it should help to return the sealing element to the run state hen it is desired to retrieve the well tool device from the well.

SUMMARY OF THE INVENTION

The present invention relates to an extrusion preventing device for incorporation into a sealing element of a well tool device, where the extrusion preventing device comprises:
  a wire wound with a plurality of turns to form a torus-shaped coiled spring;
  characterized in that:
  each turn of the torus-shaped coiled spring is canted.

As used herein, the term incorporation is used to describe that torus-shaped coiled spring is integrated into the material of the of the sealing element, i.e, that the material of the sealing element surrounds the available space outside of and inside of the torus-shaped coiled spring.

More specifically, the torus-shaped coiled spring is moulded into the material of the sealing element. Hence, the present invention is relates to an extrusion preventing device for moulding into a sealing element of a well tool device. Hence the present invention is a type of sealing element incorporable extrusion preventing device.

The torus-shaped coiled spring is a ring torus, having an opening through its center.

In one aspect, each turn of the torus-shaped coiled spring is canted with respect to a poloidal plane.

The poloidal plane may be defined as the plane in which the minor radius of the torus is defined. Alternatively, the poloidal plane may be defined as the plane defined by the longitudinal center axis through the center of an opening of the torus-shaped coiled spring and the radial direction perpendicular to the longitudinal center axis.

In one aspect, each turn of the torus-shaped coiled spring is canted with a first angle with respect to a radial direction of the poloidal plane. The radial direction is perpendicular to the longitudinal center axis of the torus-shaped coiled spring.

In one aspect, each turn of the torus-shaped coiled spring is canted with a second angle with respect to a longitudinal direction of the poloidal plane. The longitudinal direction is parallel to the longitudinal center axis of the torus-shaped coiled spring.

The sealing element has a radially retracted or run state and a radially expanded or set state. Hence, also the extrusion preventing device has these two states when incorporated into the sealing element.

It should be noted that the torus-shaped coiled spring will still be canted both in its run and in its set states, but the angle will typically be different in these two states.

It should be noted that there are many poloidal planes in the toroidal direction around the torus. Hence, the poloidal plane for the first turn is different from the poloidal plane for the second turn etc. Hence, each turn of the torus-shaped coiled spring is canted with respect to the poloidal plane at the location of the respective turns.

In one aspect, the first angle is between 3° and 60°, preferably between 10° and 40° in the run state.

In one aspect, the second angle is between 3° and 60°, preferably between 10° and 40° in the run state.

In one aspect, the first angle and/or the second angle are larger in the set state than in the run state.

In one aspect, the extrusion preventing device further comprises a first core provided inside the torus-shaped coiled spring, where the first core comprises:
  a further wire wound with a plurality of turns to form a further torus-shaped coiled spring;
  where each turn of the further torus-shaped coiled spring is canted.

In one aspect, the wire is wound in a first toroidal direction and the further wire of the first core is wound in a second toroidal direction opposite of the first toroidal direction.

In one aspect, the torus-shaped coiled spring is wave-shaped in the toroidal direction.

The present invention also relates to a well tool device comprising:
  a mandrel device having a longitudinal center axis;
  a sealing device provided radially outside of the mandrel device, where a sealing element of the sealing device is configured to be brought from a radially retracted state to a radially expanded state, where the sealing element in the radially extracted state is brought into sealing contact with an inner surface of a well;
  characterized in that the well tool device further comprises an extrusion preventing device according to any one of the above claims incorporated into the sealing element.

In one aspect, the extrusion preventing device of the well tool device is moulded into the sealing element.

The present invention also relates to a sealing element for a well tool device, where the sealing element comprises:
  a body made of an elastomeric material;
  an extrusion preventing device incorporated into the sealing element, wherein the extrusion preventing device comprises a wire wound with a plurality of turns to form a torus-shaped coiled spring;
  characterized in that:
  each turn of the torus-shaped coiled spring is canted.

In one aspect, the extrusion preventing device is moulded into the elastomeric material.

The present invention also relates to a method for manufacturing a sealing element for a well tool device, wherein the method comprises the steps of:
- providing a mould shaped as the sealing element;
- inserting an extrusion preventing device comprising a wire wound with a plurality of turns to form a torus-shaped coiled spring into the mould;
- filling molten elastomeric material into the mould, thereby incorporating the torus-shaped coiled spring into the molten elastomeric material;
- curing the elastomeric material;
- retrieving the sealing element from the mould.

During tests of the prior art straight spring, pressure tests was not always conclusive—most tests got satisfying results, while some tests failed. During the development of the present invention, it was found that the tests failed because one or a few windings of the straight spring in the set state became canted in one direction, while the adjacent winding(s) became canted in the opposite direction, thereby causing a relatively long distance between two adjacent windings in the set state. Between these two adjacent windings, the flexible material of the sealing element was allowed to extrude under high pressure, causing the pressure test to fail.

According to the present invention, the windings are all canted in the same direction in the run state, and hence, it is ensured that all windings are also all canted in the same direction in the set state. Hence, the risk of two adjacent windings being canted in two opposite directions have been eliminated or at least considerably reduced.

DETAILED DESCRIPTION

Embodiments of the invention will now be described in detail with reference to the enclosed drawings, where:

FIG. 1c illustrates a torus representing the coiled spring, where a poloidal plane PP and some other geometric definitions of a torus are indicated;

FIG. 1d (inside a dashed box) illustrates how the plane PP in FIG. 1c can be rotated around two different axis;

FIG. 2a illustrates a perspective view of a prior art coiled spring used as an extrusion preventing device;

FIG. 2b illustrates a top view of the coiled spring of FIG. 2a;

FIG. 2c illustrates a side view of the coiled spring of FIG. 2a;

FIG. 2d illustrates the cross sectional view along line A-A in FIG. 2c;

FIG. 2e illustrates the cross sectional view along line B-B of FIG. 2b;

FIG. 2f illustrates an enlarged view of the dashed box DB of FIG. 2d;

FIGS. 3a-f correspond to FIG. 2a-2f, but shows a prior art coiled spring with a core formed by two coiled springs;

FIG. 4a illustrates a perspective view of a first embodiment of a coiled spring used as an extrusion preventing device according to the present invention;

FIG. 4b illustrates a top view of the coiled spring of FIG. 4a;

FIG. 4c illustrates a side view of the coiled spring of FIG. 4a;

FIG. 4d illustrates the cross sectional view along line L-L in FIG. 4c;

FIG. 4e illustrates the cross sectional view along line M-M of FIG. 4b;

FIG. 4f illustrates an enlarged view of the dashed box DB of FIG. 4d;

FIG. 5a illustrates a perspective view of a first embodiment of a coiled spring used as an extrusion preventing device according to the present invention;

FIG. 5b illustrates a top view of the coiled spring of FIG. 5a;

FIG. 5c illustrates a side view of the coiled spring of FIG. 5a;

FIG. 5d illustrates the cross sectional view along line L-L in FIG. 5c;

FIG. 5e illustrates the cross sectional view along line M-M of FIG. 5b;

FIG. 5f illustrates an enlarged view of the dashed box DB of FIG. 5d;

FIG. 6a illustrates a perspective view of a first embodiment of a coiled spring used as an extrusion preventing device according to the present invention;

FIG. 6b illustrates a top view of the coiled spring of FIG. 6a;

FIG. 6c illustrates a side view of the coiled spring of FIG. 6a;

FIG. 6d illustrates the cross sectional view along line L-L in FIG. 6c;

FIG. 6e illustrates the cross sectional view along line M-M of FIG. 6b;

FIG. 6f illustrates an enlarged view of the dashed box DB of FIG. 6d;

TERMS AND DEFINITIONS

Initially, some terms and definitions will be discussed. These terms and definitions are relevant for both the detailed description below, and for the claims.

Figure 1A:
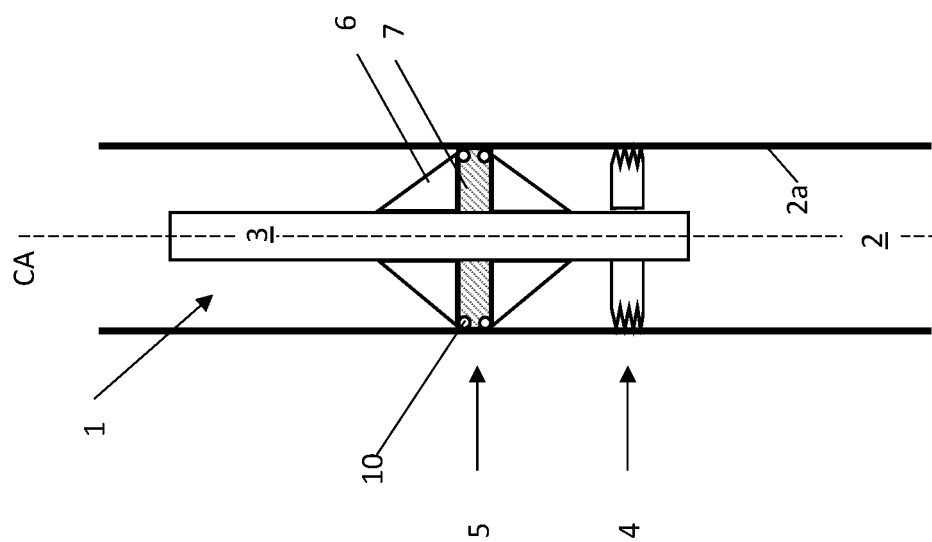
FIG. 1a illustrates schematically a prior art well tool device in its run or radially retracted state.

First, it is referred to FIG. 1c, where some geometric parameters of a torus are indicated. It should be noted that the torus of FIG. 1c is a ring torus, having an opening 13. A center axis CA is indicated in the center of the opening 13. When incorporated into a sealing element of the well tool of FIGS. 1a and 1b, the center axis CA of the extrusion preventing device 10 will typically coincide with the center axis of the well tool 1.

As mentioned in the introduction above, a torus has a minor radius rm and a major radius Rm, as indicated in FIG. 1c. Moreover, a toroidal direction is indicated by arrow TD and is often referred to as the "long way around the torus", while a poloidal direction is indicated by arrow PD and is often referred to as the "short way around the torus".

A plane, hereinafter referred to as a poloidal plane PP, is also indicated in FIG. 1c, shown as a vertical rectangle, where a first short side is coinciding with the center axis CA, the second short side is parallel to the center axis and the first long side is coinciding with the radial direction RD (and hence, the second long side is also coinciding with the radial direction, as, by definition, the radial direction RD is perpendicular to the center axis). Alternatively, the poloidal plane PP may be defined as the plane in which the minor radius rm of the torus is defined. It should be noted that there is a plurality of different poloidal planes when moving in the toroidal direction around the torus.

In FIG. 1d, it is illustrated how the poloidal plane PP of FIG. 1c can be rotated around two different axes referred to as longitudinal direction axis LD (i.e. parallel with the center axis CA) and the radial axis RD (i.e. perpendicular to center axis CA):

1) Axis LD, where the PP plane, now referred to as PP-LD has been rotated around the axis LD that is parallel to center axis CA. LD goes through the center of the turns, i.e. in the start of vector rm. The plane PP-LD has been rotated around LD at an angle α1.

2) Axis RD, where the PP plane, now referred to as PP-RD has been rotated around axis R that is perpendicular to CA. R goes through the center of the turns, i.e. in the start of vector rm. The plane PP-RD has been rotated around R at an angle α2.

It is now referred to FIGS. 2e and 2f again. The first line L1 shown in FIG. 2f, defined in the introduction above, is located in the poloidal plane PP. The second line L2 shown in FIG. 2e defined in the introduction above, is also located in the poloidal plane PP. As these lines L1 and L2 are both provided in the poloidal plane PP, each turn of the torus-shaped coiled spring 12 is considered to be located in this poloidal plane PP. The purpose of this description is to use the poloidal plane to describe how the coils are spun along the radius R in FIG. 2f in the toroidal direction while retaining the circular cross section projected onto the unrotated poloidal plane PP. With other words, the embodiment of FIG. 2a-f, each turn of the torus-shaped coiled spring 12 is considered to be "straight".

Example 1

It is now described to FIG. 4a-f, where a first embodiment of the extrusion preventing device 10 is described.

Similar to prior art, the extrusion preventing device 10 comprises a wire 11 wound with a plurality of turns T1, T2, T3, Tn to form a torus-shaped coiled spring 12.

In FIG. 4f, points P1 and P2 are defined similar to the points P1 and P2 of FIG. 2f. The first point P1 is located between a first turn T1 and a second turn T2 proximal to the center axis CA of the torus-shaped coiled spring 12, while the second point P2 is defined as a second point P2 located in the center of the first turn T1 distal to the center axis CA. The first and the second turns T1, T2 are adjacent to each other. It should be noted that this first line L1 can be drawn between first and second points P1, P2 defined for any one of the turns of the torus-shaped coiled spring 12.

In FIG. 4f, it is shown that each turn of the torus-shaped coiled spring 12 is canted. The canting angle is shown as α1, which corresponds in direction (but not necessarily in size) with angle α1 in FIG. 1d. Hence, each turn of the coiled spring 12 in FIG. 4f is canted with a first angle α1 with respect to a radial direction RD of the poloidal plane PP. By means of the definition of FIG. 1d, each winding of the coiled spring 12 is provided in the plane PP-LD.

It is now referred to FIG. 4e. Here, third and fourth points P3 and P4 are defined similar to the points P3 and P4 of FIG. 2e. The third point P3 is located between a third turn T3 and a fourth turn T4 in the lower part LP of the torus-shaped coiled spring 12 and the fourth point P4 is located in the center of the third turn T3 in the upper part UP of the torus-shaped coiled spring 12. The second line L2 is drawn between points P3 and P4. Here, the second line L2 is in the longitudinal direction LD and the angle α2 in FIG. 4e (and hence also in FIG. 1d) is 0°.

It should be noted that turns T1 and T2 in FIG. 4f does not necessarily are adjacent to turns T3 and T4 in FIG. 4e. Hence, while T1 is adjacent to T2 (FIG. 4f) and T3 is adjacent to T4 (FIG. 4e), T2 and T3 are not necessarily adjacent to each other. However, due to the torus-shape of the coiled spring, the relationship between T1 and T2 (and points P1 and P2) in FIG. 4f is true for all windings in the toroidal direction around the torus, and the relationship between T3 and T4 (and points P3 and P4) in FIG. 4e is true for all windings in the toroidal direction around the torus.

A torus-shaped coiled spring 12 according to the embodiment of FIG. 4a-f has a larger weight when compared with the prior art torus-shaped coiled spring 12 of FIG. 2a-f even if the coiled springs 12 both have the same wire radius Rw, the same outer radius Roc and the same inner radius Ric. This is caused by the longer wire needed to manufacture the torus-shaped coiled spring 12 of the first embodiment of FIG. 4a-f.

Example 2

It is now described to FIG. 5a-f, where a second embodiment of the extrusion preventing device 10 is described.

Here, in FIG. 5f, it is shown that each turn of the torus-shaped coiled spring 12 is canted (as indicated by line L1 as defined in the first embodiment above) with a first angle α1≈30° with respect to a radial direction RD of the poloidal plane PP.

It is now referred to FIG. 5e. Here, third and fourth points P3 and P4 are defined similar to the points P3 and P4 of FIGS. 2e and 4e above. The second line L2 here has an angle α2≈30° with respect to the longitudinal direction LD of the poloidal plane PP. The longitudinal direction LD is perpendicular to the longitudinal center axis CA.

According to the above, each turn of the torus-shaped coiled spring (12) is canted with a relatively smaller first angle (α1) with respect to a radial direction (RD) of the poloidal plane (PP) and is canted with a relatively larger second angle α2 with respect to the longitudinal direction LD of the poloidal plane PP.

It should be noted that the windings can have a first angle α1=0° and hence only be canted with a second angle α2 with respect to the longitudinal direction LD of the poloidal plane PP. In such an example, each winding would be oriented in the plane PP-RD shown in FIG. 1d.

The embodiment of the second example will have the same or similar advantages as the embodiment of example 1.

Example 3

It is now described to FIG. 6a-f, where a third embodiment of the extrusion preventing device 10 is described.

Here, in FIG. 6f, it is shown that each turn of the torus-shaped coiled spring 12 is canted (as indicated by line L1 as defined in the first embodiment above) with a first angle α1≈40° with respect to a radial direction RD of the poloidal plane PP.

It is now referred to FIG. 5e. Here, third and fourth points P3 and P4 are defined similar to the points P3 and P4 of FIGS. 2e and 4e above. The second line L2 here has an angle α2≈35° with respect to the longitudinal direction LD of the poloidal plane PP.

According to the above, each turn of the torus-shaped coiled spring (12) is canted with a relatively large first angle (α1) with respect to a radial direction (RD) of the poloidal plane (PP) and is canted with a relatively large second angle α2 with respect to the longitudinal direction LD of the poloidal plane PP.

The embodiment of the third example will have the same or similar advantages as the embodiment of example 1.

Figure 1B:
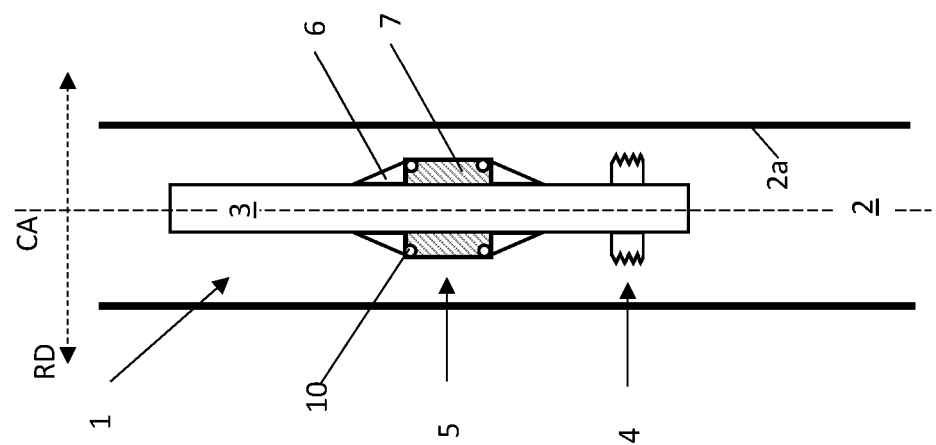
FIG. 1b illustrates schematically the prior art well tool device in its set or radially expanded state.

The above examples and drawings show the coiled spring 12 in its radially retracted state. When incorporated into a sealing element 7 used in a well tool device 1, the sealing element 7 with its extrusion preventing device 10 will expand radially. Due to the typical location of the extrusion preventing device 10 in the radially outer parts of the sealing element 7, as shown in FIGS. 1a and 1b, both the inner diameter Ric and the outer diameter Roc (defined in FIG. 2d) will increase in the set state. This may also cause the canted angles α1 and/or α2 to increase further in the set state. In all of the above embodiments of the extrusion preventing device 10, the extrusion preventing device 10 may comprise a first core 20 provided inside the torus-shaped coiled spring 12. The first core 20 may comprise core segments or the prior art core 20 shown in FIG. 3a-f (i.e. a straight torus-shaped coiled spring 22 made from a wire 21). Alternatively, each turn of the further torus-shaped coiled spring 22 may be canted as described for the above first, second or third embodiment. A second core 30 may also be provided inside the first core 20.

The wire 11 forming the torus-shaped coiled spring 12 may be wound in a first toroidal direction TD, while the further wire 21 of the core 20 may be wound in a second toroidal direction opposite of the first toroidal direction TD.

It should be noted that in some of the above drawings, the windings are numbered clockwise and in other drawings, they are numbered counterclockwise. This is a matter of definition only and is mainly done to obtain positive angles α1, α2.

It should further be noted that there are many poloidal planes in the toroidal direction around the torus. Hence, the poloidal plane PP for the first turn is different from the poloidal plane PP for the second turn etc. Hence, each turn of the torus-shaped coiled spring 12 is canted with respect to the poloidal plane PP at the location of the respective turns.

The invention claimed is:

1. An extrusion preventing device for incorporation into a sealing element of a well tool device, wherein the extrusion preventing device comprises:
   a wire wound with a plurality of turns to form a torus-shaped coiled spring,
   wherein each turn of the torus-shaped coiled spring is canted with a first angle (α1) with respect to a radial direction of a poloidal plane, and
   wherein each turn of the torus-shaped coiled spring is canted with a second angle (α2) with respect to a longitudinal direction of the poloidal plane.

2. The extrusion preventing device according to claim 1, wherein the first angle (α1) is between 3° and 60°, preferably between 10° and 40° in a run state.

3. The extrusion preventing device according to claim 1, wherein the second angle (α2) is between 3° and 60°, preferably between 10° and 40° in a run state.

4. The extrusion preventing device according to claim 1, wherein the first angle (α1) or the second angle (α2) are larger in a set state than in a run state.

5. The extrusion preventing device according to claim 1, where the extrusion preventing device further comprises a first core provided inside the torus-shaped coiled spring, wherein the first core comprises:
   a further wire wound with a plurality of turns to form a further torus-shaped coiled spring;
   wherein each turn of the further torus-shaped coiled spring is canted.

6. The extrusion preventing device according to claim 5, wherein the wire is wound in a first toroidal direction and the further wire of the first core is wound in a second toroidal direction opposite of the first toroidal direction.

7. A well tool device comprising:
   a mandrel device having a longitudinal center axis;
   a sealing device provided radially outside of the mandrel device,
   wherein a sealing element of the sealing device is configured to be brought from a radially retracted state to a radially expanded state, where the sealing element in the radially expanded state is brought into sealing contact with an inner surface of a well,
   wherein the well tool device further comprises an extrusion preventing device incorporated into the sealing element,
   wherein the extrusion preventing device comprises a wire wound with a plurality of turns to form a torus-shaped coiled spring,
   wherein each turn of the torus-shaped coiled spring is canted with a first angle (α1) with respect to a radial direction of a poloidal plane, and
   wherein each turn of the torus-shaped coiled spring is canted with a second angle (α2) with respect to a longitudinal direction of the poloidal plane.

8. The well tool device according to claim 7, wherein the extrusion preventing device is moulded into the sealing element.

9. A sealing element for a well tool device, wherein the sealing element comprises:
   a body made of an elastomeric material; and
   an extrusion preventing device incorporated into the sealing element,
   wherein the extrusion preventing device comprises a wire wound with a plurality of turns to form a torus-shaped coiled spring,
   wherein each turn of the torus-shaped coiled spring is canted with a first angle (α1) with respect to a radial direction of a poloidal plane, and
   wherein each turn of the torus-shaped coiled spring is canted with a second angle (α2) with respect to a longitudinal direction of the poloidal plane.

10. The sealing element according to claim 9, wherein the extrusion preventing device is moulded into the elastomeric material.

11. A method for manufacturing a sealing element for a well tool device, wherein the method comprises:
    providing a mould shaped as the sealing element;
    inserting an extrusion preventing device comprising a wire wound with a plurality of turns to form a torus-shaped coiled spring into the mould;
    filling molten elastomeric material into the mould, thereby incorporating the torus-shaped coiled spring into the molten elastomeric material;
    curing the elastomeric material; and
    retrieving the sealing element from the mould,
    wherein each turn of the torus-shaped coiled spring is canted with a first angle (α1) with respect to a radial direction of a poloidal plane, and
    wherein each turn of the torus-shaped coiled spring is canted with a second angle (α2) with respect to a longitudinal direction of the poloidal plane.

* * * * *